H. M. LEESE.
TIRE PROTECTOR.
APPLICATION FILED FEB. 29, 1908.
906,437.
Patented Dec. 8, 1908.
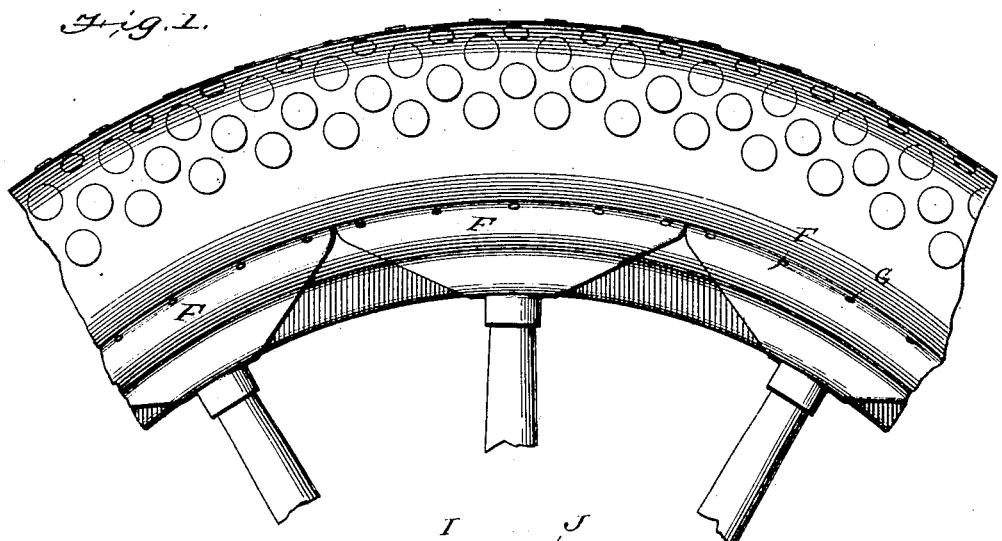
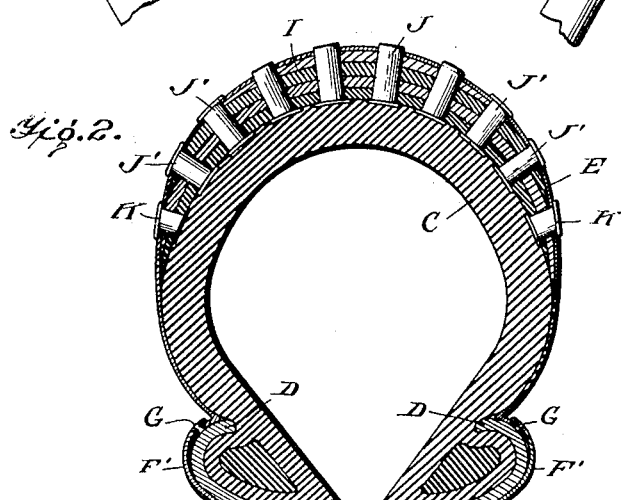
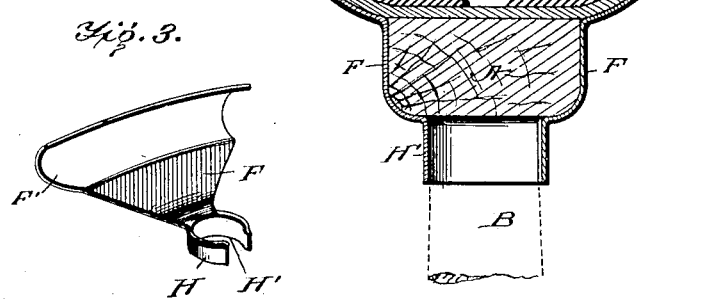
Witnesses
L. H. Schmidt.
Perry B. Turpie.
Inventor
HARRY M. LEESE,
By Attorneys Munn & Co

UNITED STATES PATENT OFFICE.

HARRY M. LEESE, OF WASHINGTON, DISTRICT OF COLUMBIA.

TIRE-PROTECTOR.

No. 906,437.  Specification of Letters Patent.  Patented Dec. 8, 1908.

Application filed February 29, 1908. Serial No. 418,428.

*To all whom it may concern:*

Be it known that I, HARRY M. LEESE, a citizen of the United States, and resident of Washington city, in the District of Columbia, have invented a new and useful Improvement in Tire-Protectors, of which the following is a specification.

My invention is an improvement in tire protectors having for its object to provide a construction adapted for the protection of new tires and of tires that have become worn, and which can be readily applied to and removed from the tire; and the invention consists in certain novel constructions and combinations of parts as will be hereinafter described and claimed.

In the drawing, Figure 1 is a side view of a section of an automobile wheel provided with my improvement. Fig. 2 is a cross section thereof, and Fig. 3 is a detail perspective view of one of the fastening plates.

The wheel may in general respects be of ordinary construction having the rim A, spokes B, and tire C, the latter being held by the flanged plate D.

The improvement comprises the outer sheet or cover E which extends over the tire down to the juncture thereof with the plate D and for a short distance along the outer side of the plate D, the said cover extending entirely around the wheel, as will be understood by those skilled in the art.

A series of fastening plates F, extending around the rim of the wheel under the opposite sides thereof are riveted at their outer edges at G to the portions of the cover plate E lapping upon the flanged plate D, and the fastening plates F extend thence inwardly, conforming to the contour of the rim and tire holding plate D, and are provided at their inner ends with double armed laterally extending clasps H which are sprung upon the spokes B, one on one side of the said spokes and the other on the other side thereof, one or the other of the opposite clasps H embracing the other when applied, as will be understood from Figs. 2 and 3 of the drawing. The inner faces of the plates F and their clasps H may have linings of felt as shown at F' and H' in Fig. 3, to avoid marring the painted or enameled portions of the wheel.

By the described construction it will be undertsood the covering E may be securely held upon the tire to protect the same and to take the wear and may be quickly applied to and removed from the wheel, the fastening plates F being secured separately to the spokes and without the use of any separate fastening devices.

The tread of the tire is reinforced by a series of layers I within the cover E and presenting therewith in cross section, as shown in Fig. 2, a segmental reinforcement in which are seated armor studs J. The layers I and the covering E are preferably of chrome tanned leather.

Near their outer edges the layers J are secured by rivets K to the covering plate E and these rivets K together with the armor studs J operate to preserve the reinforcing layers I and covering plate E in proper relation to the circumference of the protector.

It will be noticed that some of the armor studs on opposite sides of the central line of the tire are headed at their outer ends, as best shown at J' in Fig. 2, this being desirable to prevent the covering sheet from becoming entirely free toward its edges should the central portion of the covering become worn at any time.

By the special construction described it will be noticed that when the plates F are applied to the wheel as shown in Figs. 1 and 2, the said plates will conform neatly to the rim and tire securing plates producing a neat finish and will underlie the said securing plate and rim, thus adding to the security of the covering and the spring clasps being relatively contracted toward their extremities will operate to grasp the spokes and be self retaining thereon, thus avoiding the necessity of separate fastenings.

I claim:

1. The combination substantially as herein described with the wheel spokes, rim, tire and tire securing plate, of a covering plate extending over the tire and lapping at its opposite edges upon the tire securing plate, fastening plates riveted at their outer edges to the inner edges of the covering plate, and extending thence inwardly and conforming to the tire securing plate, and to the rim and provided at their inner ends with laterally extending double armed clasps embracing the spokes adjacent to the rim, the reinforcing layers within the cover plate and over the tread of the tire and tapering toward their opposite edges producing a crescent shape cross section, rivets securing said reinforcing layers to the covering plate at the edges of said layers and armor studs extending through said layers and cover plate between the said rivets, all substantially as and for the purposes set forth.

2. In a tire protector the combination with a covering plate adapted to fit over a tire, of fastening plates arranged in circumferential series and secured at their outer edges to the inner edges of the covering plate and extending thence inwardly, and provided at their inner edges with laterally extending double armed clasps to embrace spokes adjacent to a wheel rim and contracted relatively toward their extremities whereby they may spring into engagement with the spokes, substantially as set forth.

3. The combination in a wheel with the spokes, rim, tire and tire securing plate of a covering plate adapted to fit over the tire, and fastening plates secured at their outer edges to the inner edges of the covering plate and extending thence inwardly and conforming to the tire securing plate and the rim and provided at their inner ends with clasps connected with the spokes, substantially as set forth.

4. A tire protector comprising a covering adapted to fit over a tire, and fastening plates arranged in circumferential series at the opposite edges of said covering and secured at their outer edges to the inner edges of the covering, the opposite fastening plates being provided with inwardly projecting double armed clasps embracing the spokes, and one of the opposing clasps embracing the other, all substantially as and for the purposes set forth.

HARRY M. LEESE.

Witnesses:
SOLON C. KEMON,
PERRY B. TURPIN.